US012522168B2

United States Patent
Ohno et al.

(10) Patent No.: US 12,522,168 B2
(45) Date of Patent: Jan. 13, 2026

(54) VEHICLE PASSENGER PROTECTING DEVICE

(71) Applicant: TOYOTA JIDOSHA KABUSHIKI KAISHA, Toyota (JP)

(72) Inventors: Mitsuyoshi Ohno, Miyoshi (JP); Akira Kaneko, Toyota (JP); Tatsuya Hashido, Nishikasugai-gun Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/043,570

(22) Filed: Feb. 3, 2025

(65) Prior Publication Data

US 2025/0263039 A1 Aug. 21, 2025

(30) Foreign Application Priority Data

Feb. 20, 2024 (JP) ................. 2024-023657

(51) Int. Cl.
  *B60R 21/015* (2006.01)
  *B60R 21/0136* (2006.01)
  *B60R 21/213* (2011.01)
  *B60R 21/232* (2011.01)

(52) U.S. Cl.
  CPC .... *B60R 21/01554* (2014.10); *B60R 21/0136* (2013.01); *B60R 21/213* (2013.01); *B60R 21/232* (2013.01)

(58) Field of Classification Search
  CPC .... B60R 21/207; B60R 21/232; B60R 21/213
  See application file for complete search history.

(56) References Cited

U.S. PATENT DOCUMENTS

| 5,496,061 | A  | * | 3/1996  | Brown  | B60R 21/217 |
|           |    |   |         |        | 280/730.2 |
| 6,568,754 | B1 | * | 5/2003  | Norton | B60N 2/865 |
|           |    |   |         |        | 297/216.12 |
| 10,112,570 | B2 | * | 10/2018 | Barbat | B60N 2/143 |
| 10,843,653 | B2 | * | 11/2020 | Ohno   | B60R 21/23138 |
| 11,718,260 | B2 | * | 8/2023  | Ohachi | B60N 2/888 |
|            |    |   |         |        | 280/730.1 |

(Continued)

FOREIGN PATENT DOCUMENTS

| CN | 118683472 A * | 9/2024  | .......... B60N 2/4279 |
| DE | 102015204933 A1 * | 10/2015 | .......... B60R 21/207 |

(Continued)

*Primary Examiner* — Nicole T Verley
(74) *Attorney, Agent, or Firm* — Dinsmore & Shohl LLP

(57) ABSTRACT

A vehicle passenger protecting device includes: a side airbag installed at least in a vehicle transverse direction outer side end portion of a headrest of a vehicle seat, and configured to, due to gas supplied at a time of a side collision, inflate and expand toward a vehicle front side at least at a vehicle transverse direction outer side of a head of a passenger seated on the vehicle seat; and a curtain airbag that is installed in at least a roof side rail of the vehicle, and that inflates and expands toward a vehicle lower side due to gas being supplied thereto at a time of a side collision of the vehicle. The side airbag for a head is configured so as to inflate and expand only in a case in which a seatback of the vehicle seat has been reclined by a predetermined angle or more.

11 Claims, 6 Drawing Sheets

(56) References Cited

U.S. PATENT DOCUMENTS

| | | | |
|---|---|---|---|
| 11,745,686 B2 * | 9/2023 | Ohno | B60R 21/207 |
| | | | 280/728.2 |
| 2008/0296876 A1 | 12/2008 | Ideue | |
| 2019/0225184 A1 * | 7/2019 | Ohno | B60N 2/0252 |
| 2019/0291679 A1 * | 9/2019 | Niikuni | B60N 2/888 |
| 2020/0108792 A1 * | 4/2020 | Ohno | B60R 21/235 |
| 2020/0307484 A1 * | 10/2020 | Adler | B60R 21/2338 |
| 2022/0080917 A1 * | 3/2022 | Sakurai | B60N 2/0276 |
| 2022/0396233 A1 | 12/2022 | Ohno et al. | |
| 2024/0262340 A1 | 8/2024 | Numajiri et al. | |
| 2025/0058733 A1 * | 2/2025 | Iwama | B60R 21/23138 |

FOREIGN PATENT DOCUMENTS

| | | | | |
|---|---|---|---|---|
| DE | 102017121798 A1 * | 3/2019 | | B60R 21/2346 |
| DE | 102019203033 A1 * | 9/2020 | | B60R 21/23138 |
| DE | 102019118841 A1 * | 1/2021 | | B60N 2/143 |
| DE | 102020212537 A1 * | 4/2022 | | B60R 21/23138 |
| DE | 102021133951 A1 * | 6/2023 | | B60N 2/4249 |
| EP | 4212396 A1 * | 7/2023 | | B60N 2/0272 |
| JP | H08-175309 A | 7/1996 | | |
| JP | 2008-290529 A | 12/2008 | | |
| JP | 5954268 B2 | 7/2016 | | |
| JP | 2017100689 A * | 6/2017 | | |
| JP | 6399004 B2 * | 10/2018 | | B60R 21/26 |
| JP | 6428929 B2 * | 11/2018 | | B60R 21/207 |
| JP | 2019-127101 A | 8/2019 | | |
| JP | 2020-055465 A | 4/2020 | | |
| JP | 6783715 B2 * | 11/2020 | | B60R 21/207 |
| JP | 2022-188683 A | 12/2022 | | |
| JP | 2023-035747 A | 3/2023 | | |
| JP | 2024058409 A * | 4/2024 | | B60R 21/264 |
| KR | 20190040836 A * | 4/2019 | | B60R 21/23138 |
| KR | 20220033354 A * | 3/2022 | | B60R 21/23138 |
| WO | WO-2021059766 A1 * | 4/2021 | | B60N 2/42763 |
| WO | WO-2022055082 A1 * | 3/2022 | | B60R 21/264 |
| WO | WO-2024202738 A1 * | 10/2024 | | B60R 21/206 |

* cited by examiner

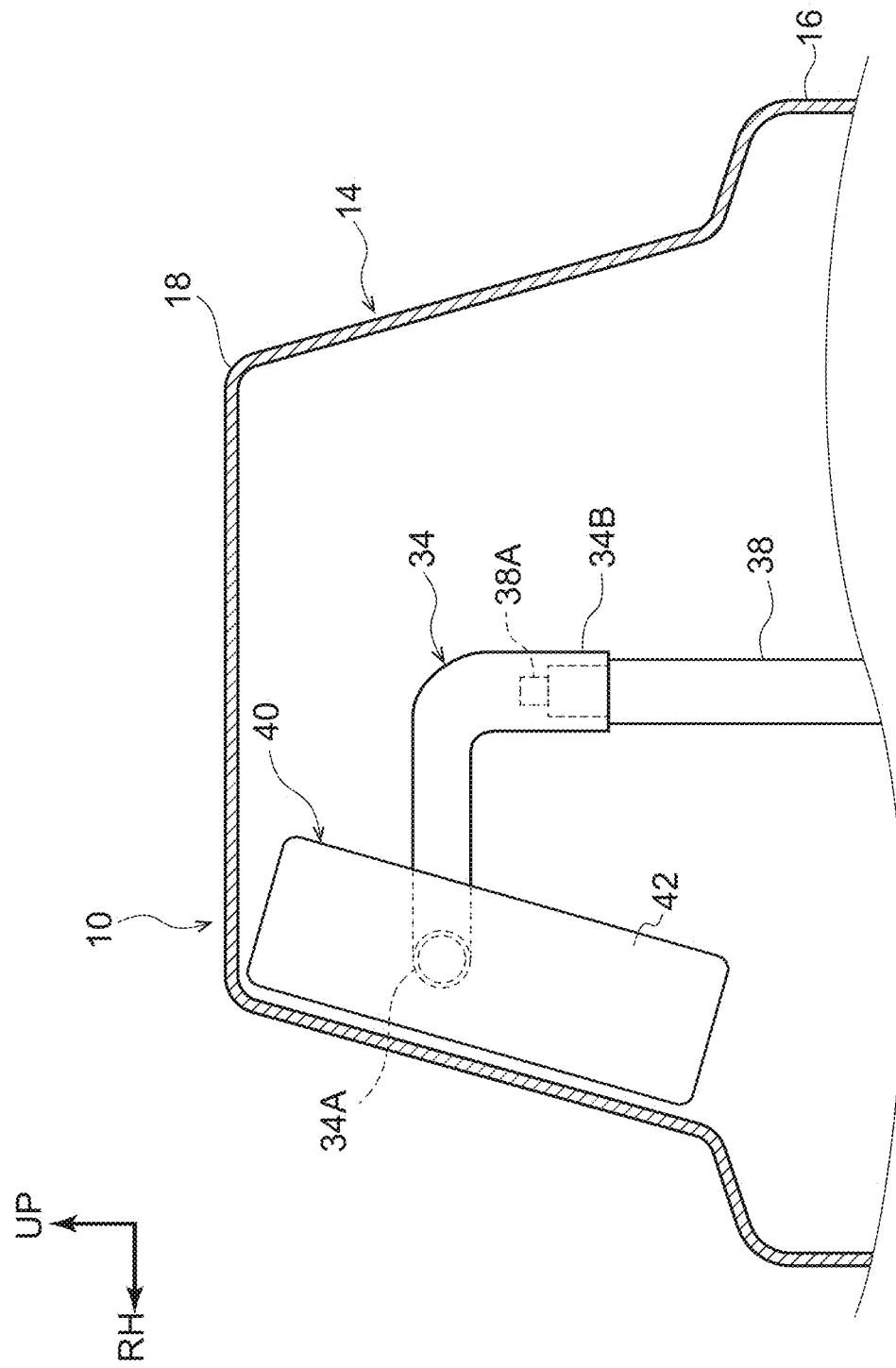

VEHICLE PASSENGER PROTECTING DEVICE

CROSS-REFERENCE TO RELATED APPLICATION

This application is based on and claims priority under 35 USC 119 from Japanese Patent Application No. 2024-023657 filed on Feb. 20, 2024, the disclosure of which is incorporated by reference herein.

BACKGROUND

Technical Field

The present disclosure relates to a vehicle passenger protecting device.

Related Art

There is conventionally known a curtain airbag device for a vehicle having a distal end chamber that receives a supply of gas from a main chamber and inflates and expands at the vehicle front side, further toward the vehicle lower side than the door beltline (refer to Japanese Patent Application Laid-Open (JP-A) No. 2020-055465 for example). This curtain airbag device for a vehicle has, at the lower end portion region of a curtain airbag that is contacted by the head of a passenger when the vehicle seat has been set in a relaxed state, a restraining performance improving portion (high frictional force imparting portion) that increases the reaction force at the time of restraining the head. The head of the passenger slipping-out toward the vehicle transverse direction outer side (the window side) is thereby suppressed.

Further, there is also conventionally known a headrest that incorporates therein an airbag that inflates and expands at the lateral side and substantially in front of the head of the passenger when a collision from oblique direction occurs at a vehicle (see, for example, JP-A No. H08-175309).

However, at times of traveling such as during automatic driving of the vehicle, if the seatback is set in a relaxed posture of being reclined to the recommended limit position, the head of the passenger is very low toward the vehicle lower side, and therefore, there is the possibility that the head of the passenger may be out of the range of the inflating portion of the curtain airbag. Namely, there is the possibility that the head of the passenger will not be able to be protected by the curtain airbag at the time of a side collision of the vehicle.

Even if a side airbag for the head, which inflates and expands at the lateral side of and substantially in front of the head of a passenger, is provided at the headrest, at the time of a side collision of the vehicle, there is the concern that the side airbag for the head that has been inflated and expanded will interfere with (hit) the curtain airbag, and therefore, there is the concern that the inflation and expansion of the curtain airbag will be impeded. If the curtain airbag does not expand normally all the way to the vehicle lower side, at the time of a rollover that may occur thereafter, the ability to prevent the passenger from being thrown out of the vehicle is not ensured.

Thus, an object of the present disclosure is to provide a vehicle passenger protecting device that can protect the head of a passenger at the time of a side collision of the vehicle, regardless of the reclining angle of the seatback of a vehicle seat and without affecting the inflation and expansion of a curtain airbag.

SUMMARY

In order to achieve the above-described object, a vehicle passenger protecting device of a first aspect relating to the present disclosure includes: a side airbag for a head, that is installed at least in a vehicle transverse direction outer side end portion of a headrest of a vehicle seat, and that is configured to, due to gas being supplied thereto at a time of a side collision of a vehicle, inflate and expand toward a vehicle front side at least at a vehicle transverse direction outer side of a head of a passenger seated on a seat cushion of the vehicle seat; and a curtain airbag that is installed in at least a roof side rail of the vehicle, and that inflates and expands toward a vehicle lower side due to gas being supplied thereto at a time of a side collision of the vehicle, wherein the side airbag for a head is configured so as to inflate and expand only in a case in which a seatback of the vehicle seat has been reclined by a predetermined angle or more.

In accordance with the vehicle passenger protecting device of the first aspect, the side airbag for a head is structured so as to inflate and expand only in cases in which the seatback of the vehicle seat has been reclined by a predetermined angle or more. Here, because the reclining angle of the seatback has been specified as a predetermined angle or more as described above, the position of the headrest is limited to a specific region at the vehicle lower side.

Accordingly, at the time of a side collision of the vehicle in a case in which the seatback of the vehicle seat has been reclined by a predetermined angle or more, even though the side airbag for a head inflates and expands from the headrest, the side airbag for a head impeding the inflation and expansion of the curtain airbag is suppressed. Due thereto, at the time of a side collision of the vehicle in a case in which the seatback of the vehicle seat has been reclined by a predetermined angle or more, the head of the passenger is protected by the side airbag for a head, and, at the time of a rollover of the vehicle, the passenger is protected by the curtain airbag (is prevented from being thrown out to the exterior of the vehicle).

Further, the side airbag for a head does not inflate and expand in a case in which the seatback of the vehicle seat has not been reclined by the predetermined angle or more. Namely, at the time of a side collision of the vehicle in this case, the head of the passenger is protected by the curtain airbag. In this way, in accordance with the present disclosure, the head of the passenger is protected at the time of a side collision of the vehicle, regardless of the reclining angle of the seatback of the vehicle seat and without affecting the inflating and expansion of the curtain airbag. Note that what is called "at the time of a collision" here also includes times when the inevitability of a collision is predicted (forecast).

Further, in a vehicle passenger protecting device of a second aspect relating to the present disclosure, in the vehicle passenger protecting device of the first aspect, the predetermined angle is an angle at which the side airbag for a head that has been inflated and expanded does not interfere with an inflating portion of the curtain airbag.

In accordance with the vehicle passenger protecting device of the second aspect, the predetermined angle at the time when the seatback of the vehicle seat has been reclined is an angle at which the side airbag for a head that has been inflated and expanded does not interfere with the inflating portion of the curtain airbag. Accordingly, at the time of a side collision of the vehicle in a case in which the seatback of the vehicle seat has been reclined by a predetermined angle or more, even though the side airbag for a head inflates and expands from the headrest, the side airbag for a head is prevented from impeding the inflation and expansion of the curtain airbag.

Further, in a vehicle passenger protecting device of a third aspect relating to the present disclosure, in the vehicle passenger protecting device of the first or second aspect, the side airbag for a head is configured so as to inflate and expand only in a case in which the seatback has been set in a relaxed posture of being reclined to a recommended limit position.

In accordance with the vehicle passenger protecting device of the third aspect, the side airbag for a head is configured so as to inflate and expand only at times in a case in which the seatback of the vehicle seat is in the relaxed posture of being reclined to the recommended limit position. Accordingly, at the time of a side collision of the vehicle, even though the side airbag for a head inflates and expands from the headrest, the side airbag for a head is prevented even more from impeding the inflation and expansion of the curtain airbag.

Further, in a vehicle passenger protecting device of a fourth aspect relating to the present disclosure, in the vehicle passenger protecting device of the third aspect, the seatback is configured so as to be able to recline to the relaxed posture only in a case in which the vehicle seat has been slid to a predetermined position at a vehicle rear side.

In accordance with the vehicle passenger protecting device of the fourth aspect, the seatback of the vehicle seat is structured so as to be able to recline to the relaxed posture only when the vehicle seat has been slid all the way to a predetermined position at the vehicle rear side. Namely, the side airbag for a head inflates and expands only when the vehicle seat has been slid to the aforementioned predetermined position and set in the relaxed posture. Accordingly, at the time of a side collision of the vehicle, even though the side airbag for a head inflates and expands from the headrest, the side airbag for a head is prevented even more from impeding the inflation and expansion of the curtain airbag.

Further, in a vehicle passenger protecting device of a fifth aspect relating to the present disclosure, in the vehicle passenger protecting device of any one of the first through fourth aspects, the side airbag for a head is configured so as to inflate and expand later than the curtain airbag.

In accordance with the vehicle passenger protecting device of the fifth aspect, the side airbag for a head is configured so as to inflate and expand later than the curtain airbag. Accordingly, as compared with a case in which the side airbag for a head is structured so as to inflate and expand simultaneously with or earlier than the curtain airbag, even though the side airbag for a head inflates and expands from the headrest at the time of a side collision of the vehicle in a case in which the seatback of the vehicle seat has been reclined a predetermined angle or more, the side airbag for a head is prevented even more from impeding the inflation and expansion of the curtain airbag.

Further, in a vehicle passenger protecting device of a sixth aspect relating to the present disclosure, in the vehicle passenger protecting device of any one of the first through fifth aspects, side airbags for a head are installed at the vehicle transverse direction outer side end portion and a vehicle transverse direction inner side end portion of the headrest, and, due to gas being supplied thereto at a time of a side collision of the vehicle, the side airbags for a head inflate and expand toward a vehicle front side at the vehicle transverse direction outer side and a vehicle transverse direction inner side of the head of the passenger, and front end portions at a vehicle transverse direction outer side and a vehicle transverse direction inner side of the side airbags for a head are connected integrally by a chamber for a front collision which extends in a vehicle transverse direction.

In accordance with the vehicle passenger protecting device of the sixth aspect, the side airbags for a head are installed at the vehicle transverse direction outer side end portion and the vehicle transverse direction inner side end portion of the headrest. Due to gas being supplied thereto at a time of a side collision of the vehicle, the side airbags for a head inflate and expand toward the vehicle front side at the vehicle transverse direction outer side and the vehicle transverse direction inner side of the head of the passenger, and the front end portions at the vehicle transverse direction outer side and the vehicle transverse direction inner side of the side airbags for a head are connected integrally by a chamber for a front collision that extends in the vehicle transverse direction. Accordingly, the head of the passenger can be protected not only at the time of a side collision of the vehicle, but also at the time of a front collision of the vehicle.

As described above, in accordance with the present disclosure, the head of a passenger can be protected at the time of a side collision of the vehicle, regardless of the reclining angle of the seatback of a vehicle seat and without affecting the inflation and expansion of a curtain airbag.

BRIEF DESCRIPTION OF THE DRAWINGS

Exemplary embodiments of the present disclosure will be described in detail based on the following figures, wherein:

FIG. 3 is a schematic front view illustrating, in an enlarged manner, the structure of the side airbag for the head relating to the first embodiment;

DETAILED DESCRIPTION

Embodiments relating to the present disclosure are described in detail hereinafter on the basis of the drawings. Note that, for convenience, arrow UP that is shown appropriately in the respective drawings indicates the vehicle upward direction, arrow FR indicates the vehicle frontward direction, and arrow RH indicates the vehicle rightward direction. Accordingly, in the following explanation, when vertical, longitudinal, and left-right directions are used without being specified otherwise, they refer to the vertical, the longitudinal, and the left and right of the vehicle. Further, the left-right direction is the same as the vehicle transverse direction and the seat transverse direction.

Further, in a vehicle passenger protecting device 10 relating to the present embodiment, an automobile 12 at which automatic driving is possible is used as an example of the vehicle, and a case in which passenger P is seated in vehicle seat 14 at the right side that is a front seat (the driver's seat) of the automobile 12 is used as an example. Note that the passenger P is a human dummy for a crash test, and this human dummy is, for example, an AF05 (5th percentile U.S. adult female) internationally standardized side crash dummy (World Side Impact Dummy: World SID).

First Embodiment

Figure 1:
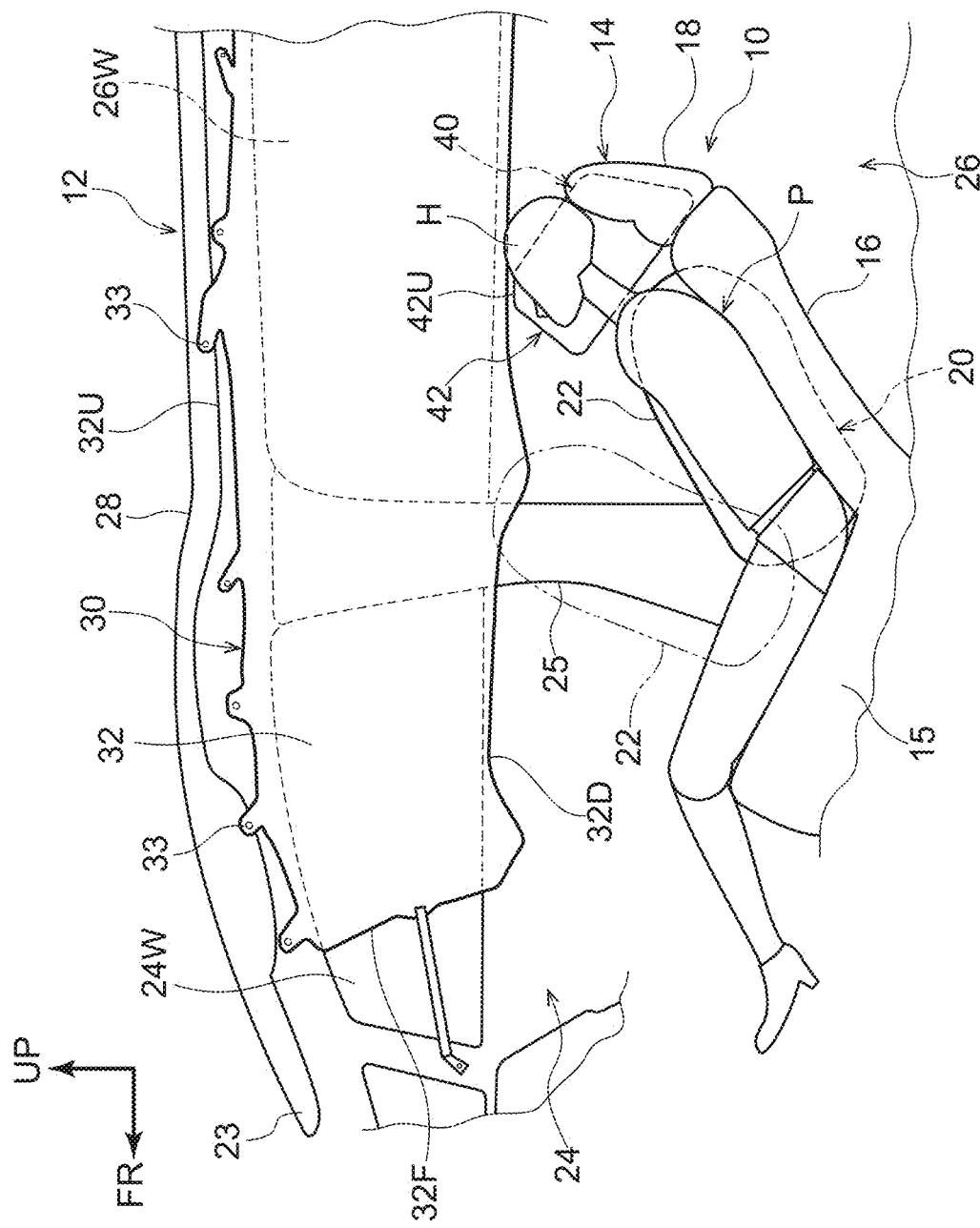
FIG. 1 is a schematic side view illustrating inflated and expanded states of a curtain airbag and a side airbag for the head relating to a first embodiment at the time when a vehicle seat has been set in a relaxed posture and positioned at a rearmost position.
Figure 2:
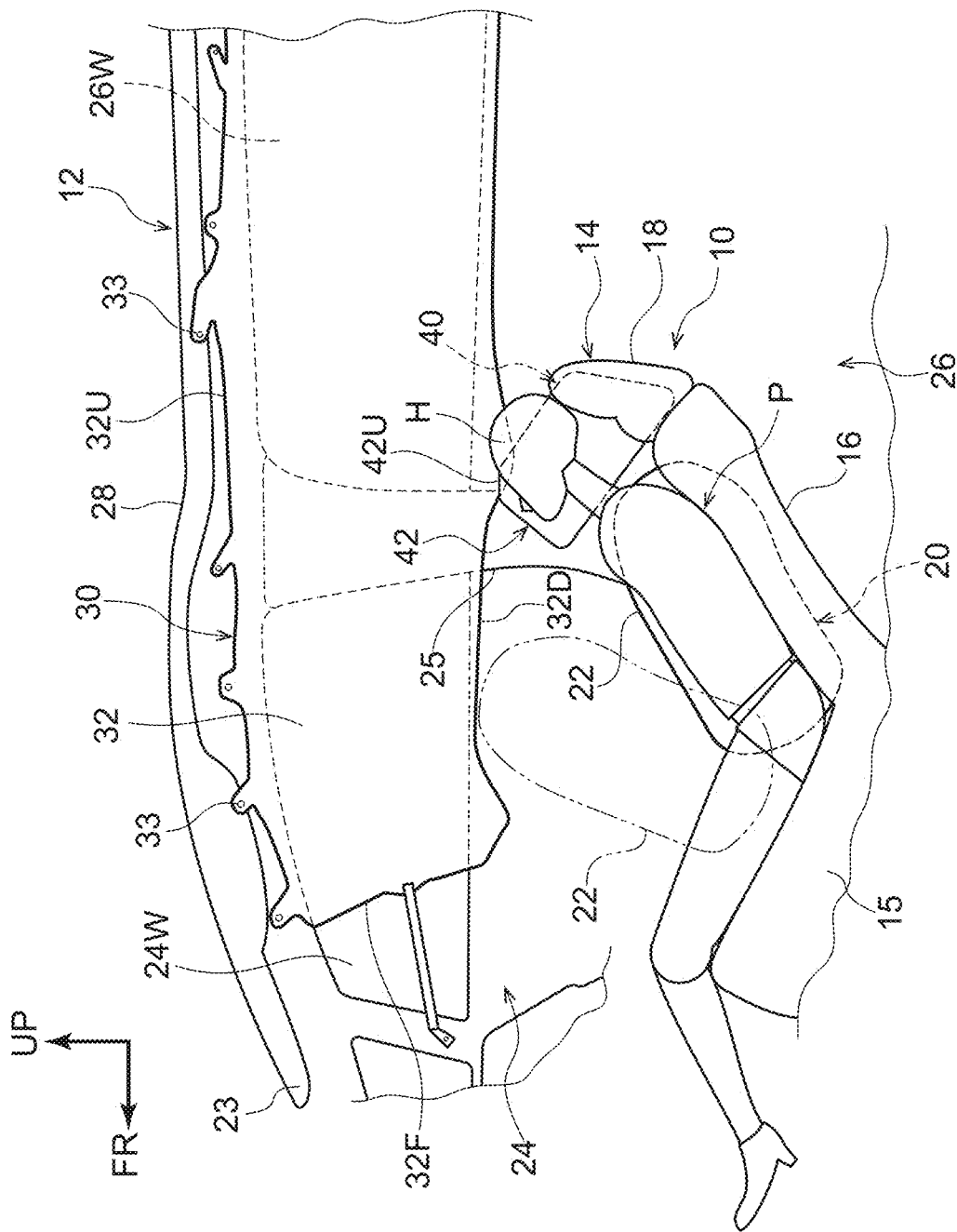
FIG. 2 is a schematic side view illustrating inflated and expanded states of the curtain airbag and the side airbag for the head relating to the first embodiment at a time when the vehicle seat has been set in the relaxed posture and positioned at a frontmost position.

A first embodiment is described first. As illustrated in FIG. 1 and FIG. 2, the vehicle seat 14 has a seat cushion 15 that supports the buttocks and thighs of the passenger P, a seatback 16 that supports the back of the passenger P, and a headrest 18 that supports head H of the passenger P. The passenger P is seated in the vehicle seat 14 in a manner of seating prescribed by a side impact test method, and is restrained in the vehicle seat 14 by the seatbelt of an unillustrated 3-point seatbelt device.

Further, the seat cushion 15 of the vehicle seat 14 is structured so as to be able to slide in the longitudinal direction by electric power, and the seatback 16 of the vehicle seat 14 is structured so as to be able to tilt in the longitudinal direction by electric power. Note that an angle sensor (not illustrated) that senses the reclining angle of the seatback 16 is provided at the vehicle seat 14. Further, hereinafter, the state in which the seatback 16 has been reclined to the recommended limit position is called the "relaxed posture". What is called the "recommended limit position" here means a position that is stood-up slightly more than the limit position to which the seatback 16 can actually be reclined.

A side airbag device 20 is installed in the side portion at the vehicle transverse direction outer side of the seatback 16 of the vehicle seat 14. This side airbag device 20 is structured to include an inflator (not illustrated) embedded in a side portion of the seatback 16, and a side airbag 22 that inflates and expands due to gas that is jetted-out from the inflator being supplied to the interior of the side airbag 22.

The inflator is a cylinder-type gas generating device that is formed substantially in the shape of a cylindrical tube for example, and is embedded such that the axial direction thereof is a direction running substantially along the vertical direction that is the extending direction of side frames (not illustrated) that structure the frame at the left and right both side portions of the seatback 16. The inflator operates when a side collision of the automobile 12 is sensed or predicted (hereinafter called "at the time of a side collision" upon occasion), and gas can be supplied instantaneously into the interior of the side airbag 22.

The side airbag 22 is formed in the shape of a simple bag due to the outer peripheral edge portions of two base fabrics being sewn together. The side airbag 22 is structured so as to, due to gas that is jetted-out from the inflator being supplied into the interior thereof, inflate and expand toward the vehicle transverse direction outer side of the passenger P seated in the vehicle seat 14. Note that, in a side view seen from the vehicle transverse direction, the side airbag 22 is formed to a size of an extent such that the side airbag 22 can cover at least the region from the waist region to the shoulder portion of the passenger P. Namely, this side airbag 22 is for the waist region and the chest region of the passenger P.

Further, curtain airbag devices 30 are installed respectively in at least roof side rails 28 at the left and the right of the automobile 12, and in detail, from the rear end portions of left and right front pillars 23 through the roof side rails 28 to the front end portions of rear pillars (not illustrated). Note that, because the curtain airbag devices 30 have the same structures but are symmetrical at the left and the right, only the curtain airbag device 30 at the right side is described hereinafter.

This curtain airbag device 30 is structured to include an inflator (not illustrated) embedded in, for example, the substantially central portion in the longitudinal direction of the roof side rail 28, and a curtain airbag 32 that inflates and expands due to gas that is jetted-out from the inflator being supplied to the interior of the curtain airbag 32.

This inflator also is a cylinder-type gas generating device that is formed substantially in the shape of a cylindrical tube for example, and is embedded such that the axial direction thereof is a direction running substantially along the longitudinal direction that is the extending direction of the roof side rail 28. The inflator operates at the time of a side collision of the automobile 12, and gas can be supplied instantaneously into the interior of the curtain airbag 32.

The curtain airbag 32 is structured integrally by double weaving by, for example, the one piece woven (abbreviated as OPW) method. In the OPW method, while two base fabrics are simultaneously woven by using a Jacquard machine, necessary places of the two base fabrics are multi-ply woven, and a bag body that is not sewn is thereby formed.

Note that the method of manufacturing the curtain airbag 32 is not limited to the above-described OPW method. For example, the curtain airbag 32 may be manufactured by sewing, in the form of a bag, one or plural base fabrics that are formed by cutting out polyamide or polyester fabric materials.

Further, at the time of a side collision or at the time of a rollover of the automobile 12, the curtain airbag 32 inflates and expands toward the lower side due to gas that is jetted-out from the inflator being supplied to the interior of the curtain airbag 32. The curtain airbag 32 is formed to be a size of an extent that, as seen in a side view, can cover at least the head H of the passenger P seated in the vehicle seat 14 that is a front seat and at least the head of a passenger (not illustrated) seated in a vehicle seat (not illustrated) that is a rear seat.

Namely, the curtain airbag 32 is structured so as to inflate and expand in the form of a curtain along a front side glass 24W of a front side door 24, and substantially the upper half of a center pillar 25 that extends in the vertical direction, and a rear side glass 26W of a rear side door 26. Accordingly, the longitudinal direction is the length direction of the curtain airbag 32.

The curtain airbag 32 is a known structure. Inflating portions (not illustrated) in which gas is filled and non-inflating portions (not illustrated) for partitioning gas supply paths are formed at predetermined, plural regions of the curtain airbag 32. At least the head H of the passenger P seated in the vehicle seat 14 that is a front seat and at least the head of the passenger seated in the vehicle seat that is a rear seat are restrained and protected by the inflating portions formed at the curtain airbag 32. Note that gas is not filled into the outer peripheral edge portions of the curtain airbag 32, i.e., an upper edge portion 32U, a lower edge portion 32D, a front edge portion 32F and a rear edge portion (not illustrated) of the curtain airbag 32, and these portions are non-inflating portions.

Plural fixing tabs 33 extend out toward the upper side at the upper edge portion 32U of the curtain airbag 32. The respective fixing tabs 33 are structures formed by a base fabric, which is similar to the base fabric of the curtain airbag 32, being cut-out in substantially rectangular forms, and are joined to the upper edge portion 32U of the curtain airbag 32 by being sewn thereto. Note that the respective fixing tabs 33 may be structures that extend out integrally from the upper edge portion 32U of the curtain airbag 32.

The respective fixing tabs 33 are positioned at the roof side rail 28 including at the rear end portion of the front pillar 23 and the front end portion of the rear pillar. Namely, the respective fixing tabs 33 are fixed to the roof side rail 28 that reaches from the rear end portion of the front pillar 23 to the front end portion of the rear pillar, by fasteners (not illustrated) such as clips or nuts and bolts for example. Note that, at usual times, the curtain airbag 32 is accommodated in the roof side rail 28 together with the inflator in a state of being formed in an elongated shape by being rolled-up in the form of a roll whose axial direction is substantially the longitudinal direction.

Figure 4A:
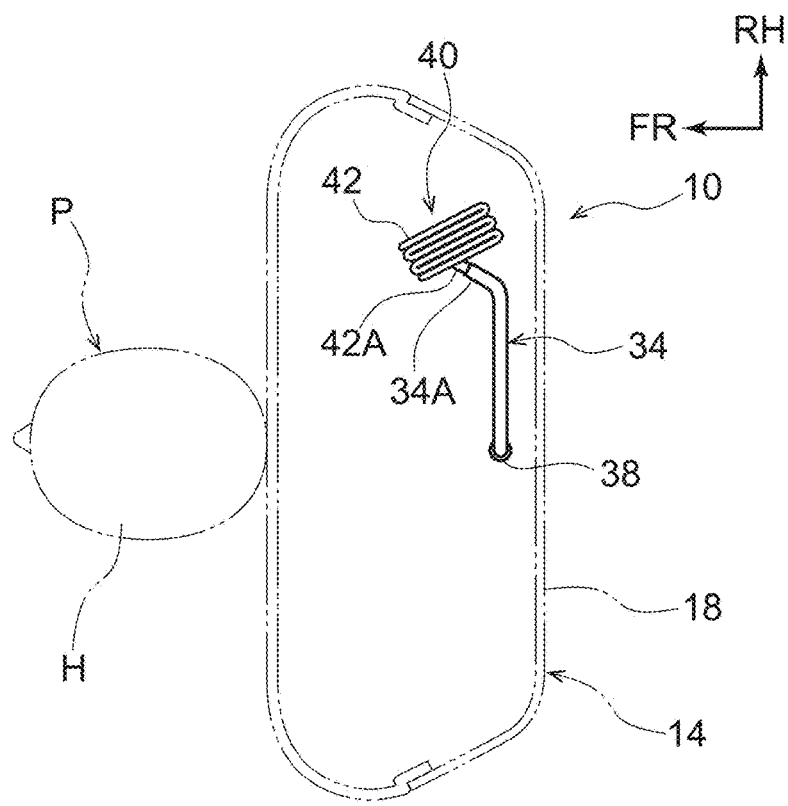
FIG. 4A is a schematic plan view illustrating a state before inflation and expansion of the side airbag for the head relating to the first embodiment.
Figure 4B:
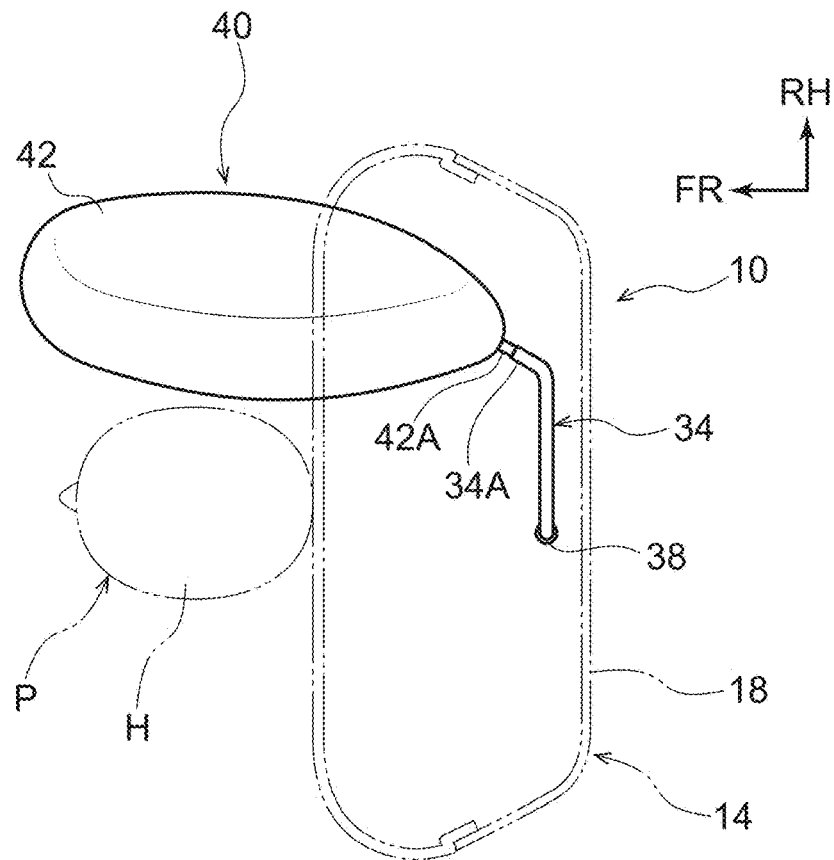
FIG. 4B is a schematic plan view illustrating a state after inflation and expansion of the side airbag for the head relating to the first embodiment.

A side airbag device 40 for the head, which can restrain and protect the head H of the passenger P seated on the seat cushion 15, is installed in the vehicle transverse direction outer side end portion of the headrest 18 of the vehicle seat 14. As illustrated in FIG. 3, FIG. 4A and FIG. 4B, the side airbag device 40 for the head has a side airbag 42 for the head, and a single inflator 38.

The inflator 38 is a cylinder-type gas generating device that is formed substantially in the shape of a cylindrical tube for example, and is provided in the seat transverse direction central portion of the rear portion side of the interior of the headrest 18 such that the axial direction of the inflator 38 is the vertical direction. Note that, depending on the length thereof, the inflator 38 may be provided so as to span from the interior of the headrest 18 to the interior of the seatback 16.

At usual times, the side airbag 42 for the head is accommodated in the vehicle transverse direction outer side of the interior of the headrest 18 in a state of being folded-up in the form of bellows. Further, the side airbag 42 for the head is structured so as to, at the time of a side collision of the automobile 12 and due to gas that is jetted-out from the inflator 38 being supplied thereto, inflate and expand from the front surface of the vehicle transverse direction outer side of the headrest 18 past the vehicle transverse direction outer side (the right side in the illustrated structure) of the head H of the passenger P and toward the front side.

More specifically, the side airbag 42 for the head is formed in the shape of an elongated bag due to two, elongated base fabrics being superposed and the upper and lower peripheral edge portions thereof being sewn together. Note that the base fabrics are respectively structured by fabric materials of polyamide or polyester for example. Further, the upper portion of the front end of the side airbag 42 for the head that has been inflated and expanded is a cut-out portion 42U that has been cut-out rectilinearly so as to not overlap the curtain airbag 32 as seen in a side view (see FIG. 1).

A jetting port 34A of a supply pipe 34 made of resin or of metal is connected to a root portion 42A of the side airbag 42 for the head. The supply pipe 34 is disposed at the rear portion side of the interior of the headrest 18. The jetting port 34A of the supply pipe 34 extends at a predetermined angle and over a predetermined length toward the vehicle transverse direction outer side and the front side as seen in a plan view (see FIG. 4A and FIG. 4B).

Further, a jetting port 38A of the inflator 38 is connected to a base portion 34B, which is cylindrical and extends downward, of the supply pipe 34. Namely, at the time of a side collision of the automobile 12, the inflator 38 jets gas out into the interior of the supply pipe 34, and the gas is supplied from the supply pipe 34 into the side airbag 42 for the head.

An unillustrated tear line is formed at an appropriate position of the front surface of the headrest 18. When the side airbag 42 for the head inflates and expands, this tear line receives the inflation pressure of the side airbag 42 for the head and ruptures. Due thereto, the side airbag 42 for the head can inflate and expand frontward from the front surface of the vehicle transverse direction outer side of the headrest 18.

The inflator of the side airbag device 20, the inflator of the curtain airbag device 30, and the inflator 38 of the side airbag device 40 for the head respectively are electrically connected to an airbag ECU (Electronic Control Unit, not illustrated) provided at the automobile 12. Side collision sensors and rollover sensors (both including cameras and the like, and none of which are illustrated) that are provided at the automobile 12 respectively are electrically connected to the airbag ECU.

The side collision sensors are structured so as sense or predict a side collision of the automobile 12 and output a side collision signal to the airbag ECU. The rollover sensors are structured so as to sense or predict a rollover of the automobile 12 and output a rollover signal to the airbag ECU.

When a side collision signal is inputted thereto, the airbag ECU operates the inflator of the side airbag device 20 and the inflator of the curtain airbag device 30 that are at the side of the side collision (the near side). Due thereto, the side airbag 22 and the curtain airbag 32 at the near side receive supplies of gas and inflate and expand. Note that, when a rollover signal is inputted thereto, the airbag ECU operates the inflators of the left and right curtain airbag devices 30.

Further, when a rollover signal is inputted after a side collision, the airbag ECU operates the inflator of the curtain airbag device 30 that is at the side (the far side) opposite the near side at which the airbag devices are already operating. A control device (not illustrated) that controls respective sections is installed in the automobile 12 separately from the airbag ECU. The aforementioned angle sensor is electrically connected to this control device.

The side airbag 42 for the head is structured so as to inflate and expand only in cases in which the seatback 16 of the vehicle seat 14 has been reclined by a predetermined angle or more. Namely, in a state in which the control device recognizes, by the aforementioned angle sensor, that the reclining angle of the seatback 16 is the predetermined angle or more, the airbag ECU operates the inflator 38 of the side airbag device 40 for the head only when a side collision signal is inputted.

In other words, in a state in which the control device recognizes, by the aforementioned angle sensor, that the reclining angle of the seatback 16 is less than the predetermined angle, even if a side collision signal is inputted, the airbag ECU does not operate the inflator 38 of the side airbag device 40 for the head.

Note that the aforementioned "predetermined angle" is an angle at which the side airbag 42 for the head that has been inflated and expanded does not interfere with the inflating portion of the curtain airbag 32, and, for example, is the angle of the time when the seatback 16 has been set in the relaxed posture. More specifically, the predetermined angle is, as a torso angle that is the angle of the seatback 16 with respect to the vertical direction, 50° or more for example.

The seatback 16 of the vehicle seat 14 may be structured so as to be able to recline to the relaxed posture only when the vehicle seat 14 has been slid all the way to a predetermined position at the vehicle rear side. Namely, there may be a structure in which the fact that the vehicle seat 14 has not been slid to the predetermined position at the vehicle rear side is sensed by a position sensor (not illustrated), and the control device carries out control such that, at times of this state, even if the switch for reclining the seatback 16 is turned on, the motor (not illustrated) that tilts the seatback 16 is not energized. Note that what is called the "predetermined position" here is the rearmost position of the vehicle seat 14 or a position that is up to 50 mm forward from the rearmost position.

The side airbag 42 for the head is structured so as to inflate and expand later than the curtain airbag 32 inflates and expands. Namely, control is carried out such that the operation signal to the inflator 38 is transmitted by the airbag ECU later than the operation signal to the inflator of the curtain airbag device 30.

Operation of the vehicle passenger protecting device 10 relating to the first embodiment that is structured as described above is described next.

When the collision sensor senses that the automobile 12 has been collided with from the side, a side collision signal is transmitted from the side collision sensor to the airbag ECU. When the side collision signal is inputted to the airbag ECU, the airbag ECU operates the inflator of the side airbag device 20 and the inflator of the curtain airbag device 30 that are at the side of the side collision (the right side in the illustrated structure), and gas is instantaneously jetted-out into the side airbag 22 and into the curtain airbag 32. Namely, the airbag ECU inflates and expands the side airbag 22 and the curtain airbag 32.

Due thereto, both in a case in which the vehicle seat 14 is positioned at the rearmost position as illustrated in FIG. 1 for example, and in a case in which the vehicle seat 14 is positioned at the frontmost position as illustrated in FIG. 2 for example, as seen in a side view, at least the region from the waist region to the shoulder portion of the passenger P is restrained and protected by the side airbag 22 (shown by the imaginary line in FIG. 1 and FIG. 2), and at least the head H of the passenger P is restrained and protected by the curtain airbag 32.

By the way, when the automobile 12 is traveling by automatic driving, there are cases in which, as illustrated in FIG. 1 and FIG. 2, the seatback 16 of the vehicle seat 14 is reclined a predetermined angle or more. At times of this state, when the side collision sensor senses that the automobile 12 has been collided with from the side, the airbag ECU inflates and expands the side airbag 42 for the head as well.

Namely, if a side collision signal is inputted to the airbag ECU in a state in which the control device recognizes, by the above-described angle sensor, that the reclining angle of the seatback 16 is a predetermined angle or more, the airbag ECU operates the inflator 38 of the side airbag device 40 for the head.

Here, as described above, because it has been specified that the seatback 16 of the vehicle seat 14 has been reclined by a predetermined angle or more, the position of the headrest 18 is limited to a specific region at the lower side. Accordingly, in this state, even though the side airbag 42 for the head is inflated and expanded from the side portion at the vehicle transverse direction outer side of the headrest 18, the side airbag 42 for the head impeding the inflation and expansion of the curtain airbag 32 can be suppressed or prevented.

In particular, if the aforementioned "predetermined angle" is made to be an angle at which the side airbag 42 for the head that has been inflated and expanded does not interfere with the inflating portion of the curtain airbag 32, and specifically, is made to be a torso angle of 50° or more, the side airbag 42 for the head can be reliably prevented from impeding the inflation and expansion of the curtain airbag 32.

Moreover, if it is made such that the side airbag 42 for the head inflates and expands only at times when the seatback 16 is set in the relaxed posture which is 50° or more as a torso angle, the side airbag 42 for the head can be even more reliably prevented from impeding the inflation and expansion of the curtain airbag 32.

Further, in a case in which the reclining angle of the seatback 16 is a predetermined angle or more and the vehicle seat 14 is positioned at the rearmost position as illustrated in FIG. 1, owing to the cut-out portion 42U, the upper portion of the front end of the side airbag 42 for the head that has been inflated and expanded does not, as seen in a side view, overlap the curtain airbag 32 that has been inflated and expanded. In other words, owing to the cut-out portion 42U, a slight gap is formed between the curtain airbag 32 that has been inflated and expanded and the upper portion of the front end of the side airbag 42 for the head that has been inflated and expanded.

Accordingly, in particular, in a case in which the reclining angle of the seatback 16 is a predetermined angle or more and the vehicle seat 14 is positioned at the rearmost position, the side airbag 42 for the head can be prevented even more from impeding the inflation and expansion of the curtain airbag 32. Accordingly, it may be made possible to recline the seatback 16 to the relaxed posture only at times when the vehicle seat 14 has been slid all the way to the aforementioned predetermined position at the rear side.

Note that, as illustrated in FIG. 2, in a case in which the reclining angle of the seatback 16 is a predetermined angle or more and the vehicle seat 14 is positioned at the frontmost position, as seen in a side view, the upper portion of the front end of the side airbag 42 for the head that has been inflated and expanded (i.e., the cut-out portion 42U) slightly overlaps the curtain airbag 32 that has been inflated and expanded.

However, the region that the upper portion of the front end of the side airbag 42 for the head (i.e., the cut-out portion 42U) overlaps is the position of the center pillar 25, and the curtain airbag 32 does not have an inflating portion at the position of the center pillar 25. Accordingly, in this case as well, the side airbag 42 for the head impeding the inflation and expansion of the curtain airbag 32 can be suppressed or prevented.

Further, the side airbag 42 for the head is structured so as to inflate and expand later than the curtain airbag 32. Accordingly, as compared with a case in which the side airbag 42 for the head is structured so as to inflate and expand simultaneously with or earlier than the curtain airbag 32, the side airbag 42 for the head impeding the inflation and expansion of the curtain airbag 32 can be prevented even more.

At the time of a side collision of the automobile 12 in a case in which the seatback 16 of the vehicle seat 14 has been reclined by a predetermined angle or more (is set in the relaxed posture), the head H of the passenger P can be restrained and protected by the side airbag 42 for the head that has been inflated and expanded in this way. Further, at the time of a rollover of the automobile 12 that may occur thereafter, the passenger P can be restrained and protected by the curtain airbag 32 that is inflated and expanded normally all the way to the lower side. Namely, the passenger P being thrown out of the vehicle at the time of a rollover of the automobile 12 can be prevented.

On the other hand, the airbag ECU does not operate the inflator 38 of the side airbag device 40 for the head in a case in which a side collision signal is inputted to the airbag ECU in a state in which the seatback 16 of the vehicle seat 14 has not been reclined by a predetermined angle or more, i.e., in a state in which the control device recognizes, by the aforementioned angle sensor, that the reclining angle of the seatback 16 is less than the predetermined angle.

Namely, in this case, because the curtain airbag 32 exists at the vehicle transverse direction outer side of the head H of the passenger P, the head H of the passenger P is restrained and protected by the curtain airbag 32 without the side airbag 42 for the head inflating and expanding. In this way, in accordance with the vehicle passenger protecting device 10 relating to the first embodiment, the head H of the passenger P can be protected at the time of a side collision of the automobile 12 regardless of the reclining angle of the seatback 16 of the vehicle seat 14 and without affecting the inflation and expansion of the curtain airbag 32.

Second Embodiment

A second embodiment is described next. Note that regions that are equivalent to those of the above-described first embodiment are denoted by the same reference numerals, and detailed description thereof (including description of common operation) is omitted as appropriate.

Figure 5:
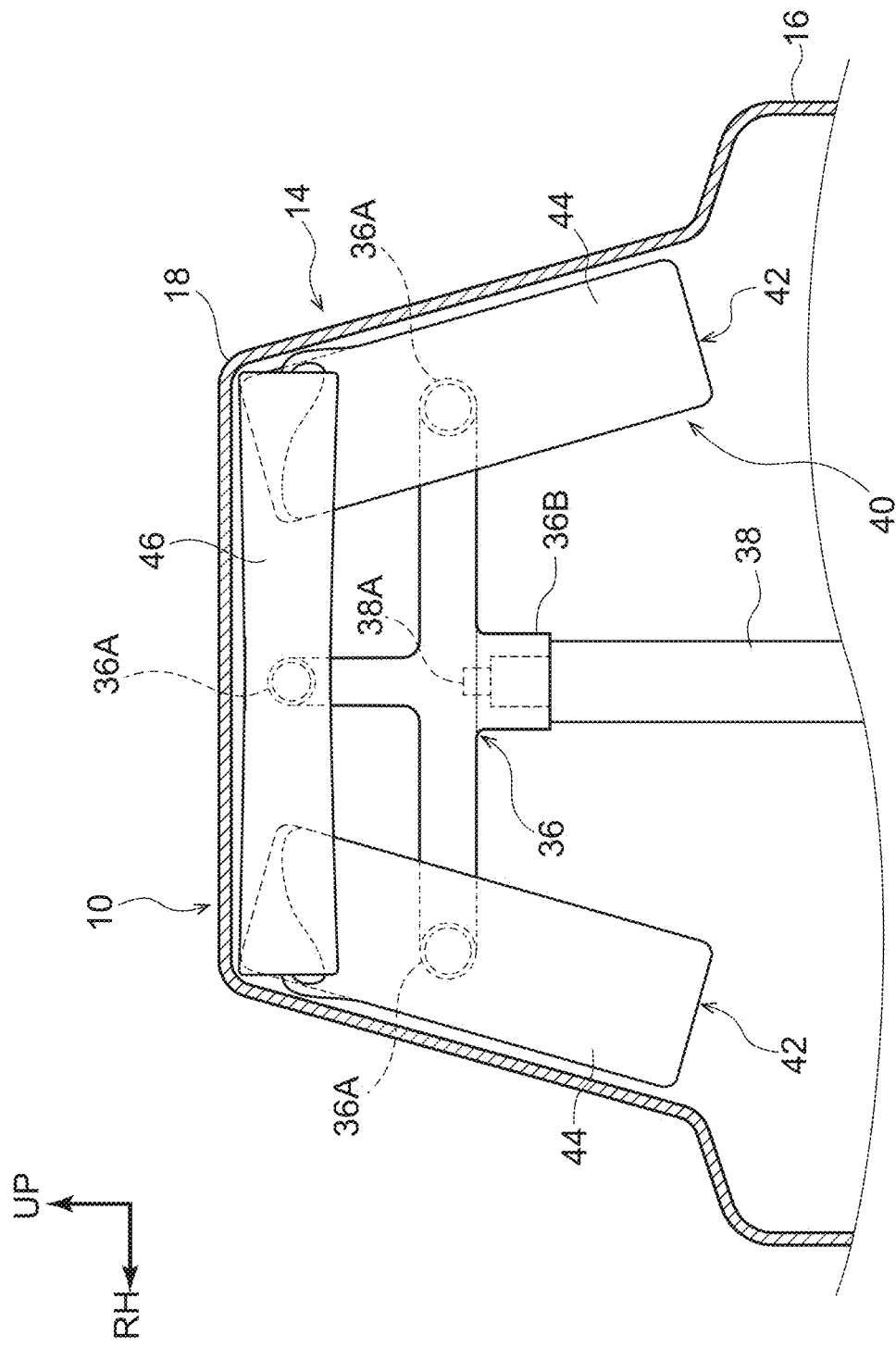
FIG. 5 is a schematic front view illustrating, in an enlarged manner, the structure of a side airbag for the head relating to a second embodiment.
Figure 6A:
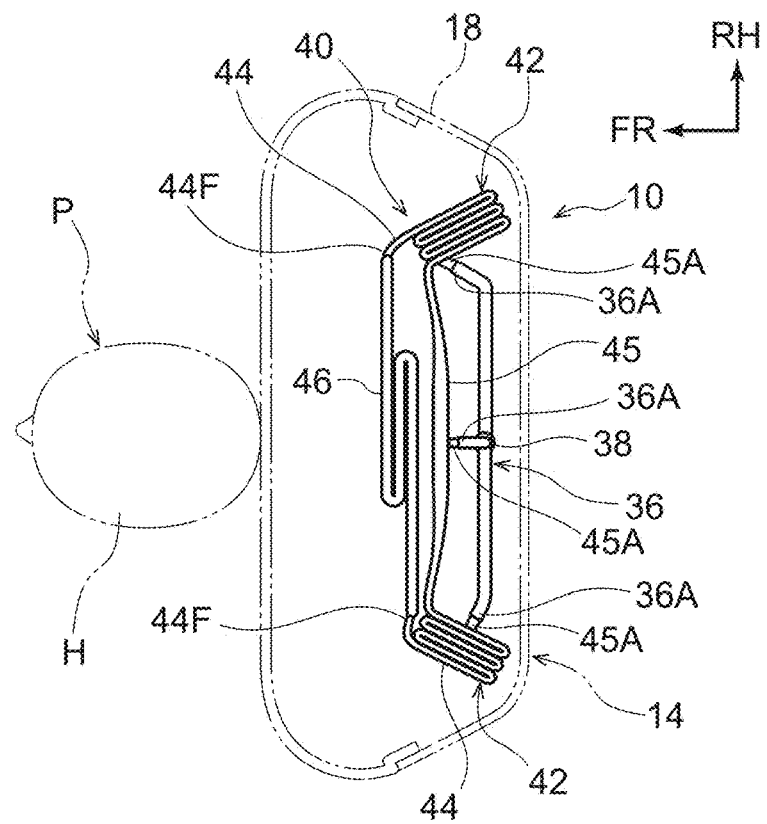
FIG. 6A is a schematic plan view illustrating a state before inflation and expansion of the side airbag for the head relating to the second embodiment.
Figure 6B:
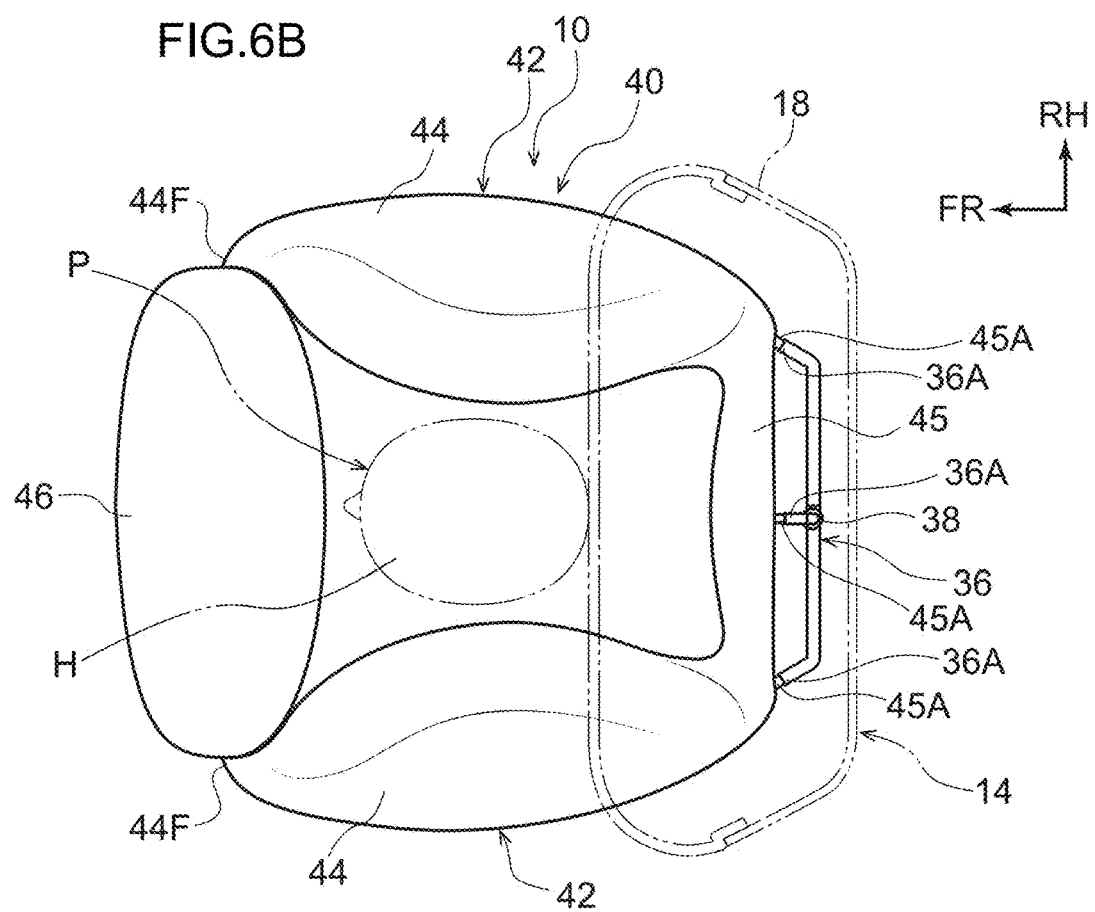
FIG. 6B is a schematic plan view illustrating a state after inflation and expansion of the side airbag for the head relating to the second embodiment.

In this second embodiment, as illustrated in FIG. 5, FIG. 6A and FIG. 6B, the side airbag 42 for the head differs from that of the above-described first embodiment only with regard to the point that the side airbag 42 for the head is installed in the vehicle transverse direction outer side end portion and the vehicle transverse direction inner side end portion of the headrest 18. This side airbag 42 for the head is structured so as to, due to gas that is jetted-out from the inflator 38 being supplied thereto, inflate and expand frontward from the front surface of the headrest 18 past the both left and right sides and the upper side of the head H of the passenger P seated on the seat cushion 15 of the vehicle seat 14.

More specifically, the side airbag 42 for the head is structured to include a pair of left and right longitudinal chambers 44 that extend in the longitudinal direction, and a chamber 46 for a front collision that extends in the seat transverse direction and integrally connects front end portions 44F of the pair of longitudinal chambers 44. In other words, the side airbag 42 for the head is formed in a substantial "U" shape that opens rearward as seen in plan view, by the pair of longitudinal chambers 44 and the chamber 46 for a front collision that project-out from the headrest 18.

The pair of longitudinal chambers 44 are structured so as to, due to gas jetted-out from the inflator 38 being supplied thereto, inflate and expand frontward past the left and right both sides of the head H of the passenger P. The chamber 46 for a front collision is structured so as to inflate and expand between the front end portions 44F of the pair of longitudinal chambers 44 later than the pair of longitudinal chambers 44, due to gas being supplied from the pair of longitudinal chambers 44 after the chamber 46 for a front collision has moved frontward past the upper side of the head H of the passenger P accompanying the inflation and expansion of the pair of longitudinal chambers 44.

Note that the pair of longitudinal chambers 44 and the chamber 46 for a front collision are formed in the shapes of elongated bags due to two, elongated base fabrics being superposed together and the upper and lower peripheral edge portions thereof being sewn together. Further, the base fabrics of the pair of longitudinal chambers 44 and the base fabric of the chamber 46 for a front collision are respectively formed of, for example, polyamide or polyester fabric materials.

Further, the pair of longitudinal chambers 44 are respectively folded up in forms of bellows, and are folded over toward the lower side with the boundary portions between the longitudinal chambers 44 and the chamber 46 for a front collision being the crease portions. Then, the side airbag 42 for the head that has been set in this state is accommodated in the interior of the headrest 18. Namely, as seen in a front view, the side airbag 42 for the head is disposed along the outer shape (the upper surface and the left and right both side surfaces) of the headrest 18 (see FIG. 5).

Further, the rear end portions of the pair of longitudinal chambers 44 are connected integrally by a rear-side connecting portion 45 that extends in the seat transverse direction. Root portions 45A, which are respectively shaped as cylindrical tubes and extend rearward, are formed integrally with the seat transverse direction both end portions and the seat transverse direction central portion of the rear surface of the rear-side connecting portion 45. Respective jetting ports 36A of a distribution pipe 36 that is described later are connected to the respective root portions 45A.

The distribution pipe 36 that is made of resin or made of metal is disposed at the rear portion side of the interior of the headrest 18. The distribution pipe 36 is formed in the shape of a cylindrical tube that is forked-off in three directions. The jetting ports 36A, which are respectively forked-off from the seat transverse direction central portion of the distribution pipe 36 toward the left-right directions and the upward direction, are respectively connected to the root portions 45A at the left and right both end portions and the central portion of the rear-side connecting portion 45. Note that, as seen in a plan view, the jetting ports 36A at the left and right both sides of the distribution pipe 36 extend at predetermined angles and over predetermined lengths toward the vehicle transverse direction outer side and the front side and toward the vehicle transverse direction inner side and the front side, respectively (refer to FIG. 6A and FIG. 6B).

The jetting port 38A of the inflator 38 is connected to a base portion 36B, which is shaped as a cylindrical tube and extends downwardly, of the distribution pipe 36. Namely, at the time of a side collision of the automobile 12, the inflator 38 jets out gas into the interior of the distribution pipe 36, and the gas is supplied from the distribution pipe 36 via the rear-side connecting portion 45 to the pair of left and right longitudinal chambers 44 respectively, and gas is supplied from the pair of left and right longitudinal chambers 44 to the chamber 46 for a front collision.

In accordance with the side airbag 42 for the head of the vehicle passenger protecting device 10 relating to the second embodiment that is structured in this way, the pair of longitudinal chambers 44 and the chamber 46 for a front collision inflate and expand frontward from the front surface of the headrest 18 in that order, and the pair of longitudinal chambers 44 are disposed at the vehicle transverse direction outer side and the vehicle transverse direction inner side of the head H of the passenger P, and the chamber 46 for a front collision is disposed at the front side of the head H of the passenger P. Accordingly, the head H of the passenger P can be protected not only at the time of a side collision of the automobile 12, but also at the time of a front collision of the automobile 12.

Although the vehicle passenger protecting devices 10 relating to the present embodiments have been described above on the basis of the drawings, the vehicle passenger protecting devices 10 relating to the present embodiments are not limited to the illustrated structures, and the designs thereof can be changed appropriately within a scope that does not depart from the gist of the present disclosure. For example, the vehicle passenger protecting devices 10 relating to the present embodiments can be applied also to cases of the vehicle seat 14 that is the front passenger's seat. Accordingly, the vehicle relating to the present embodiments is not limited to the automobile 12 that can be driven automatically.

Further, there may be a structure in which the fact that the seatback 16 of the vehicle seat 14 has been reclined by a predetermined angle or more is not sensed by the aforementioned angle sensor, and the side airbag 42 for the head is inflated and expanded only in cases in which it can be judged that, as seen in a side view, the amount of overlap of the inflated and expanded side airbag 42 for the head with the curtain airbag 32 is a predetermined amount or less, e.g., 30 mm or less. Here, the lower edge portion 32D of the curtain airbag 32 is a non-inflating portion into which gas is not filled, and the width thereof is, for example, 30 mm or less.

Accordingly, if the amount of overlap of the inflated and expanded side airbag 42 for the head with the curtain airbag 32 is 30 mm or less for example, the side airbag 42 for the head impeding the inflation and expansion of the curtain airbag 32 can be suppressed or prevented. Note that the amount of overlap of the side airbag 42 for the head with the curtain airbag 32 as seen in a side view can be estimated by, for example, sensing the position of the headrest 18 by a camera or the like that is provided in the vehicle cabin.

Further, the vehicle seat 14 is not limited to a structure that is slid or tilted by electric power, and may be a structure that is slid or tilted manually. In this case, it suffices to sense the position and the angle of reclining of the vehicle seat 14 by sensing device such as a camera provided in the vehicle cabin.

What is claimed is:

1. A vehicle passenger protecting device, comprising:
a side airbag for a head, that is installed at least in a vehicle transverse direction outer side end portion of a headrest of a vehicle seat, and that is configured to, due to gas being supplied thereto at a time of a side collision of a vehicle, inflate and expand toward a vehicle front side at least at a vehicle transverse direction outer side of a head of a passenger seated on a seat cushion of the vehicle seat; and
a curtain airbag that is installed in at least a roof side rail of the vehicle, and that inflates and expands toward a vehicle lower side due to gas being supplied thereto at a time of a side collision of the vehicle,
wherein the side airbag for a head is configured to inflate and expand only in a case in which a seatback of the vehicle seat has been reclined by a predetermined angle or more, and the side airbag for a head is configured not to inflate and expand in a case in which a reclining angle of the seatback is less than the predetermined angle.

2. The vehicle passenger protecting device of claim 1, wherein the predetermined angle is an angle at which the side airbag for a head that has been inflated and expanded does not interfere with an inflating portion of the curtain airbag.

3. The vehicle passenger protecting device of claim 1, wherein the side airbag for a head is configured to inflate and expand only in a case in which the seatback has been set in a relaxed posture of being reclined to a recommended limit position.

4. The vehicle passenger protecting device of claim 3, wherein the seatback is configured to be able to recline to the relaxed posture only in a case in which the vehicle seat has been slid to a predetermined position at a vehicle rear side.

5. The vehicle passenger protecting device of claim 1, wherein the side airbag for a head is configured to inflate and expand later than the curtain airbag.

6. The vehicle passenger protecting device of claim 1, wherein side airbags for a head are installed at the vehicle transverse direction outer side end portion and a vehicle transverse direction inner side end portion of the headrest, and, due to gas being supplied thereto at a time of a side collision of the vehicle, the side airbags for a head inflate and expand toward a vehicle front side at the vehicle transverse direction outer side and a vehicle transverse direction inner side of the head of the passenger, and front end portions at a vehicle transverse direction outer side and a vehicle transverse direction inner side of the side airbags for a head are connected integrally by a chamber for a front collision which extends in a vehicle transverse direction.

7. A vehicle passenger protecting device, comprising:
a side airbag for a head, that is installed at least in a vehicle transverse direction outer side end portion of a headrest of a vehicle seat, and that is configured to, due to gas being supplied thereto at a time of a side collision of a vehicle, inflate and expand toward a vehicle front side at least at a vehicle transverse direction outer side of a head of a passenger seated on a seat cushion of the vehicle seat; and
a curtain airbag that is installed in at least a roof side rail of the vehicle, and that inflates and expands toward a vehicle lower side due to gas being supplied thereto at a time of a side collision of the vehicle,
wherein the side airbag for a head is configured to inflate and expand only in a case in which a seatback of the vehicle seat has been reclined by a predetermined angle or more, and the side airbag for a head is configured to inflate and expand later than the curtain airbag.

8. The vehicle passenger protecting device of claim 7, wherein the predetermined angle is an angle at which the side airbag for a head that has been inflated and expanded does not interfere with an inflating portion of the curtain airbag.

9. The vehicle passenger protecting device of claim 7, wherein the side airbag for a head is configured to inflate and expand only in a case in which the seatback has been set in a relaxed posture of being reclined to a recommended limit position.

10. The vehicle passenger protecting device of claim 9, wherein the seatback is configured to be able to recline to the relaxed posture only in a case in which the vehicle seat has been slid to a predetermined position at a vehicle rear side.

11. The vehicle passenger protecting device of claim 7, wherein side airbags for a head are installed at the vehicle transverse direction outer side end portion and a vehicle transverse direction inner side end portion of the headrest, and, due to gas being supplied thereto at a time of a side collision of the vehicle, the side airbags for a head inflate and expand toward a vehicle front side at the vehicle transverse direction outer side and a vehicle transverse direction inner side of the head of the passenger, and front end portions at a vehicle transverse direction outer side and a vehicle transverse direction inner side of the side airbags for a head are connected integrally by a chamber for a front collision which extends in a vehicle transverse direction.

* * * * *